May 11, 1943.   H. A. WAGNER   2,318,726
POWER DRIVEN TRUCK
Filed Aug. 18, 1941   2 Sheets-Sheet 1
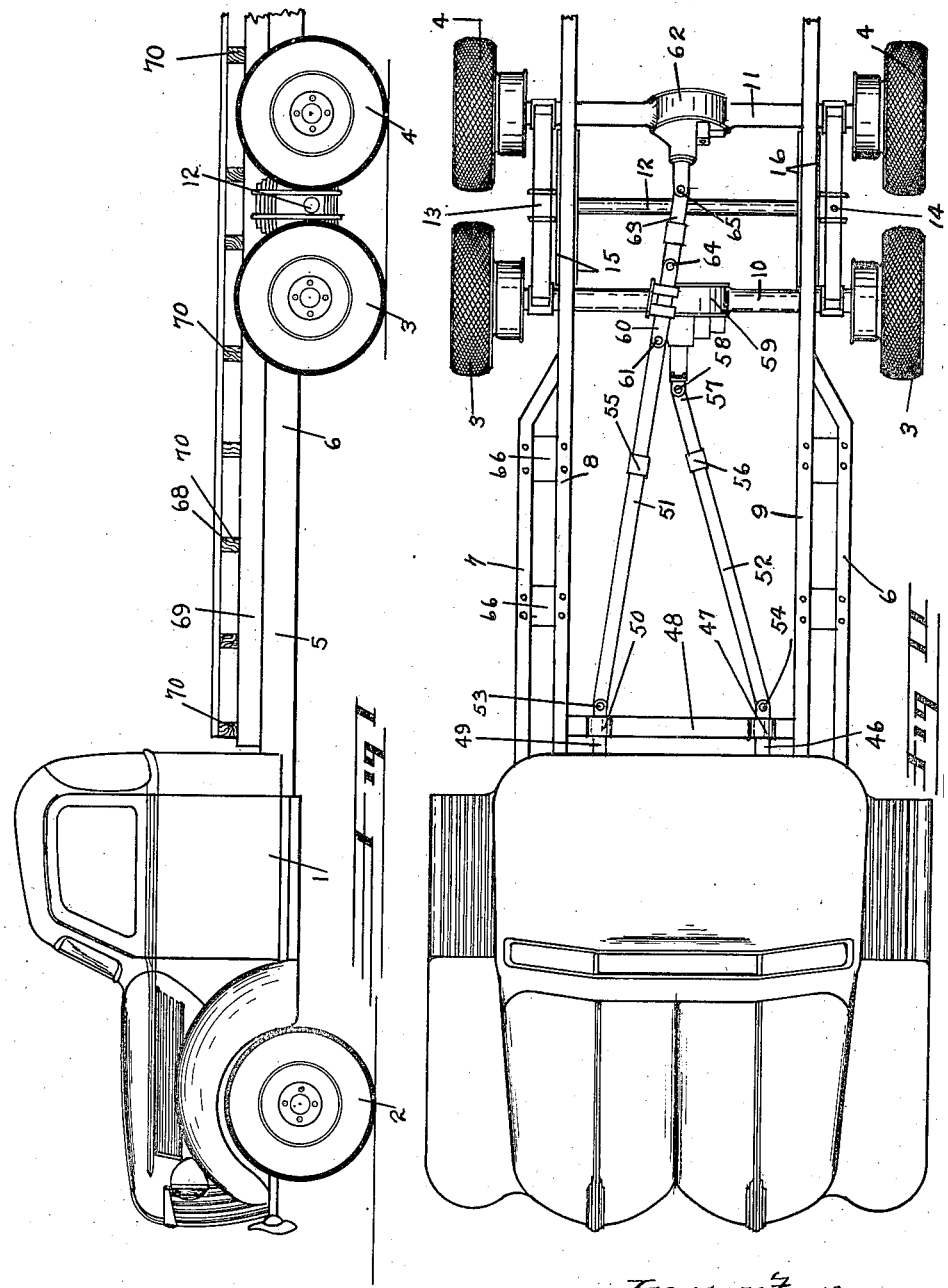
Inventor:
Harold A. Wagner May 11, 1943. H. A. WAGNER 2,318,726
POWER DRIVEN TRUCK
Filed Aug. 18, 1941 2 Sheets-Sheet 2
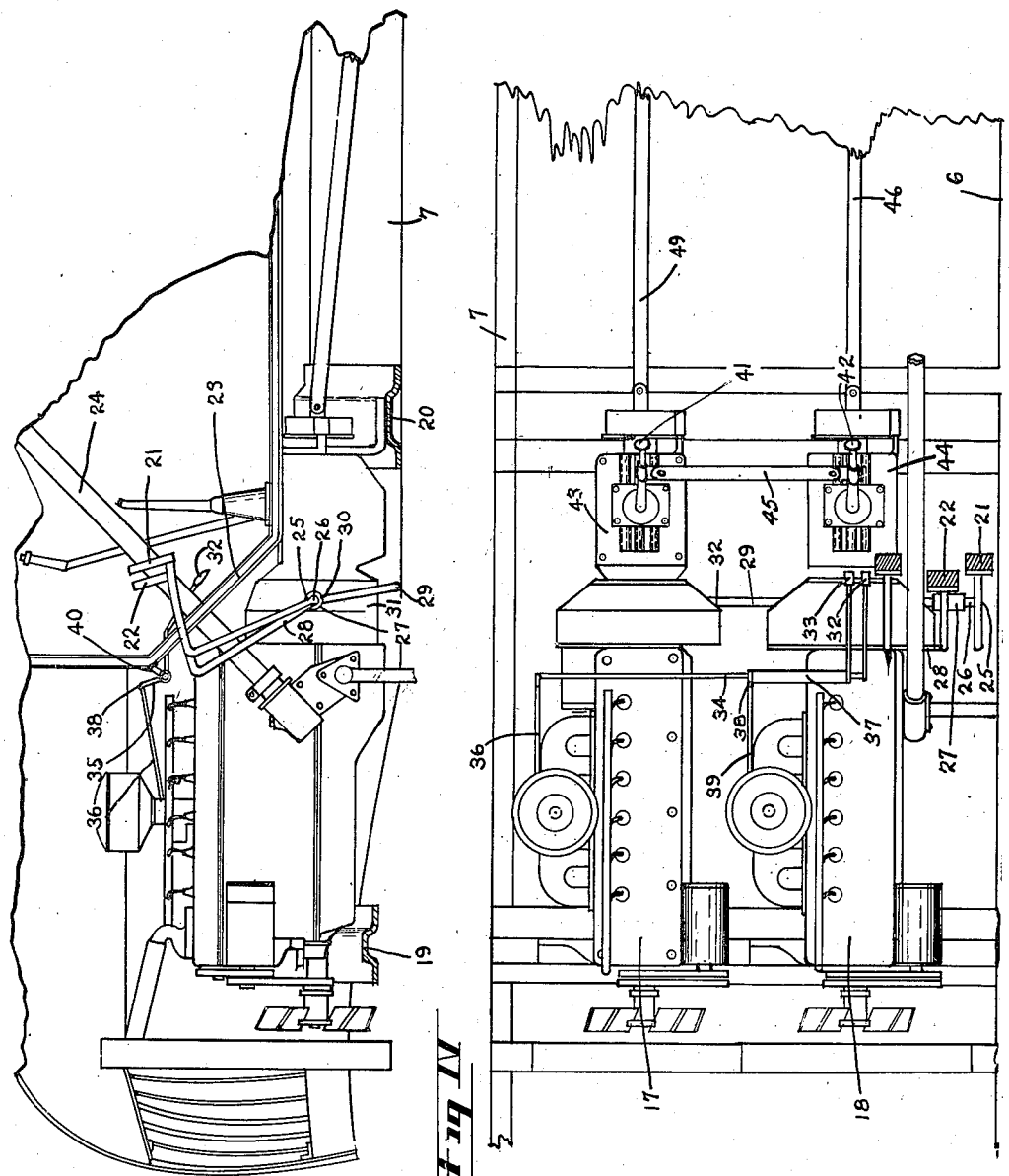
Inventor.
Harold A. Wagner.

Patented May 11, 1943

2,318,726

UNITED STATES PATENT OFFICE 2,318,726

POWER DRIVEN TRUCK

Harold A. Wagner, Portland, Oreg.

Application August 18, 1941, Serial No. 407,302

2 Claims. (Cl. 180—22)

The present invention relates to vehicles such as heavy duty trucks, and more particularly to trucks of the type having two similar prime mover engines, each independently connected to a corresponding driving axle.

Heavy duty trucks in common usage are provided with a single prime mover engine of a high horsepower rating so as normally to be capable of propelling the vehicle under full load at a relatively high rate of speed, even up moderate grades, in high gear. Thus it is obvious that on an average, such an engine is operated at much less than full capacity and, accordingly, the rate of fuel consumption is higher than if the size of the driving engine more nearly matched the actual load conditions. In many cases heavy duty trucks are operated under full load capacity only approximately fifty percent of the time. Considering such typical cases, for example, as that of a logging truck or a tank truck, which, after unloading, are returned to the loading station in an empty condition, it is obvious that while traveling empty the fuel consumption of the large engine is excessive in view of the fact that only a relatively small amount of power is actually required for propelling the vehicle during such periods of operation.

A heavy duty truck having a power plant consisting of a pair of relatively small engines may be operated considerably more economically than a truck having a single engine of a horsepower rating equal to that of the combined rating of the two smaller engines. In the case of a dual engine truck, when traveling empty or with only a light load, only a single engine need be operated, while frequently one engine may be sufficient for propelling the truck even under full load along level hard surfaced roads. The second engine may be brought into operation for propelling the fully loaded truck up grades or over soft roads when maximum power output from the power plant may be required. The fuel consumption of the dual engine power plant in which the engines are selectively operated in accordance with the load requirements is much less than the fuel consumption of a single large engine power plant which is operated with loads averaging less than full capacity.

Dual engine heavy duty trucks are also feasible from the initial cost standpoint in view of the fact that high horsepower truck engines are very costly as compared with the cost of the smaller size truck engines. This is in part due to the fact that the larger engines are produced only on a limited scale, whereas the smaller engines are frequently produced on a mass production basis with a correspondingly low unit manufacturing cost. It is a well known fact, for example, that two 90 horsepower truck engines can be purchased on the market at the present time at a figure about one-third the price of a single 180 horsepower heavy duty engine.

Dual engine trucks have been proposed heretofore in order to realize the operational advantages mentioned, but such structures as have been suggested have generally been so complicated in nature that the initial cost of such trucks has been greater than that of single engine trucks, notwithstanding the comparatively low unit cost for the engines themselves. The chassis, motor mounting, motor and gear shift control, running gear, and drive shaft connections thereto, were of such costly design as to more than offset the cost advantage from using the smaller engines.

It is a primary object of the present invention, therefore, to provide a new and improved dual engine truck arrangement which is relatively simple in design and capable of low cost manufacture.

It is a further object of the present invention to provide a new and improved frame and motor mounting arrangement for a dual engine heavy duty truck.

It is a further object of the present invention to provide a new and improved driving connection arrangement between the engines of a dual engine heavy duty truck and independent driving axles thereof.

A still further object of the invention is to provide a dual engine truck having a new and improved simplified driving control arrangement.

In accordance with the illustrated embodiment of the invention, a truck is provided with a pair of similar engines mounted in a side by side relation upon the forward end of the truck frame. The engines are supported upon a single pair of cross frame members extending between a first pair of suitably spaced side frame members. The first pair of side frame members are rigidly secured to a second pair of rearwardly extending side frame members which are spaced a conventional distance apart. A pair of standard driving axles are mounted through a suitable spring suspension under the rear end of the second pair of side frame members. The two engines are connected to the corresponding driving axles by simple and efficient drive shaft arrangements which may readily be made up of standard parts. Relatively simple means are provided for enabling either simultaneous or independent driving control of the engines by the truck operator.

Additional objects and advantages of the invention will appear from the following description, taken in connection with the accompanying drawing, while the features of novelty will be pointed out with greater particularity in the appended claims.

Referring to the drawings, Figure 1 is a side view of the dual engine truck constructed in accordance with the present invention; Figure 2 is a plan view of the truck arrangement illustrated in Figure 1, except that the truck bed has been removed in order to illustrate more clearly the arrangement of the drive shafts extending between the engines and the respective driving axles; Figure 3 is an enlarged fragmentary side view of the power plant illustrating certain details of the control arrangement; and Figure 4 is a plan view illustrating the engine arrangement of the truck.

Referring to the drawings, the truck is shown as comprising a single set of front wheels 2 and a set of tandem or dual drive rear wheels 3 and 4 provided under the rear end of the chassis 5. The chassis 5 is formed by a pair of outer side frame members 6 and 7 upon which is mounted the forward end of the truck structure and a pair of inner side frame members 8 and 9, upon which are mounted the rear driving axles. The rear driving axle assemblies 10 and 11 carrying the sets of wheels 3 and 4, respectively, are fastened to an intermediate rocker shaft 12 by suitable suspension spring arrangements 13 and 14. The rocker shaft 12 is journaled in suitable bearing plates 15 and 16 secured as by welding to the side frame members 8 and 9, respectively, and depending downwardly therefrom. The sets of wheels 3 and 4 are free to rock about the axis of the rocker shaft 12, while the load of the truck is at all times uniformly distributed therebetween. The inner side frame members 8 and 9 defining in part the rear portion of the truck frame are of a suitable separation so as to permit of the use of substantially similar standard driving axle assemblies 10 and 11. The driving axle assemblies include centrally disposed differential housings having driving connections extending forwardly therefrom which will be referred to hereinafter.

The prime mover power plant is comprised of two similar equal horsepower rated engines 17 and 18 which are mounted in a side by side relation upon the forward end of the truck chassis. It will be observed that the side frame members 6 and 7 are spaced somewhat farther apart than the rearwardly extending frame members 8 and 9 so as to provide ample room therebetween for the two engines 17 and 18. A pair of spaced transverse frame members 19 and 20 are provided between the forward ends of the side frame members 6 and 7 and upon which are mounted the engines 17 and 18 by means of the usual brackets provided on the engines.

The clutch mechanisms of the two engines are connected for operation to a pair of clutch pedals 21 and 22 which are mounted closely adjacent each other as shown more clearly in Figure 4. The clutch pedal 21 is rigidly secured to the end 25 of the clutch operating shaft 26 extending from the clutch mechanism of engine 18 adjacent thereto. The arm 28 of the clutch pedal 22 is rigidly secured to a cylindrical member 27 journaled on the shaft 26. A rod 29, rigidly secured as at 30 to the under side of the cylindrical member 27, has a U-shaped portion extending around the lower side of the clutch housing for the engine 18 and is rigidly attached at its opposite end to the clutch operating shaft of the engine 17.

A pair of fuel control pedals 32 and 33 are also provided, the pedal 32 being connected to a rocker rod 34 which in turn is provided at its opposite end with a lever 35 connected by link 36 to the carburetor of engine 17. The pedal 33 is fastened to a cylindrical shaft 37 surrounding the rocker rod 34, the cylindrical shaft 37 being provided with a lever 38 at the opposite end thereof which is connected by link 39 to the carburetor of engine 18. The rocker rod 34 and shaft 37 may be rotatably journaled in any suitable manner to the fire wall 23 of the cab, as indicated at 40.

The engines 17 and 18 include variable ratio gear transmission mechanisms 43 and 44, respectively, having operating levers 41 and 42 extending upwardly therefrom into the cab. In order that the two levers 41 and 42 may be shifted simultaneously by the operator when operating the vehicle under the power of both engines, I provide a connecting link 45 pivotally attached to the upper ends of the lever. For effecting gear shifting operations, the link 45 is grasped by the operator in its mid section and, by appropriate manipulation thereof, the gear shift levers may readily be operated simultaneously as desired. The connection link 45 is readily dismountable to allow the operator to move only one of the handles at a time in the conventional manner, as when operating the truck under the power of a single motor. Since the clutch pedals 21 and 22 are positioned closely adjacent each other, they may simultaneously be depressed with a single foot, as during shifting of both sets of gears, by means of the lever connection link 45. Also the accelerator pedals 32, 33, being positioned closely adjacent each other, may simultaneously be operated with a single foot when driving the truck with both engines operating. When driving the truck with only one engine and the gear shift levers disconnected from each other, then only the corresponding clutch and accelerator pedal need be operated. Since there is no direct connection between the latter pedals, no readjustment thereof is required when transferring between single and dual engine operation.

Extending rearwardly from the transmissions 43 and 44 are relatively short drive shaft sections 49 and 46, respectively, which are journaled at their rearward ends in suitable bearing blocks 50 and 47, respectively, mounted upon the transverse frame member 48. Drive shafts 51 and 52 connected through universal joints 53 and 54 to the ends of the shaft sections 49 and 46, respectively, extend rearwardly and are connected to correspondinging driving axle assemblies 11 and 10. The drive shafts 51 and 52 are splined as indicated at 55 and 56, respectively. The rear end of shaft 52 is connected through a universal joint 58 to the driving connection extending from the differential housing 59 of the axle assembly 10.

As regards the drive shaft connection to the rear axle, it will be understood that a straight line running from the rear end of the shaft section 49 to the differential 62 will pass relatively closely above the front axle 11. While a small clearance may be sufficient for running over smooth surfaces, provision must be made to permit the front wheels to rock about the axle 12 as may be required when operating over rough ground such as may be encountered on logging roads. In the arrangement shown the drive shaft 51 is connected by universal joint 61 to a shaft section 60 which is journaled upon the differential housing 59 of the foremost axle assembly 10. The shaft section 60 is connected to the differential 62 by a splined shaft section 63, universal joints 64 and 65 being provided between the opposite ends of the shaft section 63 and the shaft section 60 and the differential 62, respectively. It will be understood that in the operation of the truck over a relatively smooth road surface, the drive shaft 51 will extend in a substantially straight line eliminating sharp offsetting of the universal joints and minimizing the extent of wear therein. Upon the passage of the driving wheels over high surface irregularities such as rocks, stumps, or the like, the driving axle assemblies may freely rock about the axle 12 without interference from the drive shaft 51.

It will be obvious that the truck of the present invention is capable of economical construction in that relatively few parts of special design are required. The engines are of standard type and may be readily mounted upon the cross braces connecting the ends of the forward side frame members, which are suitably spaced so as to accommodate the engines therebetween. The forward side frame members 6 and 7 are rigidly secured in the mid section of the truck chassis to the rearwardly extending side frame members 8 and 9, as indicated by the gusset plates 66 in Figure 2. Relatively few simple changes are required with regard to the clutch control mechanism and the accelerator pedals for adapting these instrumentalities for control by the operator, either jointly or independently, with a single foot. The gear shift levers are connected together by a simple pivoted connecting link by means of which the gears of the two engine units may be shifted simultaneously during dual engine operation. The link may readily be detached for permitting independent operation of the gear shift levers during single engine operation. The rear driving axles, of standard design, are connected to corresponding driving engines by drive shafts which may readily be constructed from standard parts at relatively low cost with ordinary shop facilities.

Any suitable truck bed or body such as 68 may be provided upon the truck chassis as indicated by the various members 69 and 70 illustrated in Figure 1. It will be obvious that while a simple flat platform is shown, any other suitable superstructure may be provided for adapting the truck for such special services as for handling logs or the like.

Having described the invention in what is considered to be a preferred embodiment thereof, it is desired that it be understood that the specific details shown are merely illustrative, and that the invention may be carried out by other means.

What I claim is:

1. A driving unit for vehicles comprising a frame, a pair of similar independent combustion engines, means mounting said engines upon the forward end of said frame in a side by side relation, a pair of independent driving axles supporting the rear end of said frame, driving connections for said axles extending forwardly substantially centrally thereof, a drive shaft including a pair of universal joints connecting the first of said engines with the driving connection of the foremost of said driving axles, a second drive shaft connecting the second of said engines with the driving connection of the rearmost of said driving axles, said driving shafts converging toward each other rearwardly of said vehicle, a bearing means supporting the second of said drive shafts upon the foremost of said driving axles, said second drive shaft including a pair of universal joints on each of the opposite sides of said bearing means.

2. A driving unit for vehicles comprising a pair of similar independent combustion engines, supporting means for said engines including a pair of opposite side frame members, a pair of spaced cross frame members extending between said side frame members, said engines being mounted on said cross frame members, a pair of similar rear driving axle assemblies, driving connections extending forwardly substantially centrally of said assemblies, drive shafts connected at their forward ends to corresponding ones of said engines, said drive shafts extending rearwardly between said side frame members and converging angularly towards each other, the rear ends of each said drive shafts being connected to corresponding driving connections of said axle assemblies, bearing means on the foremost axle assembly supporting the drive shaft extending to the rearmost axle assembly, said last mentioned drive shaft including universal joints on the opposite sides of said bearing means and extending normally in a straight line between the connections with the corresponding engine and axle driving connection.

HAROLD A. WAGNER.